Inventor
Thomas J. Hollmeyer.
Jacob Buchert.
By Murray, Sackhoff & Paddack.
Attorneys.

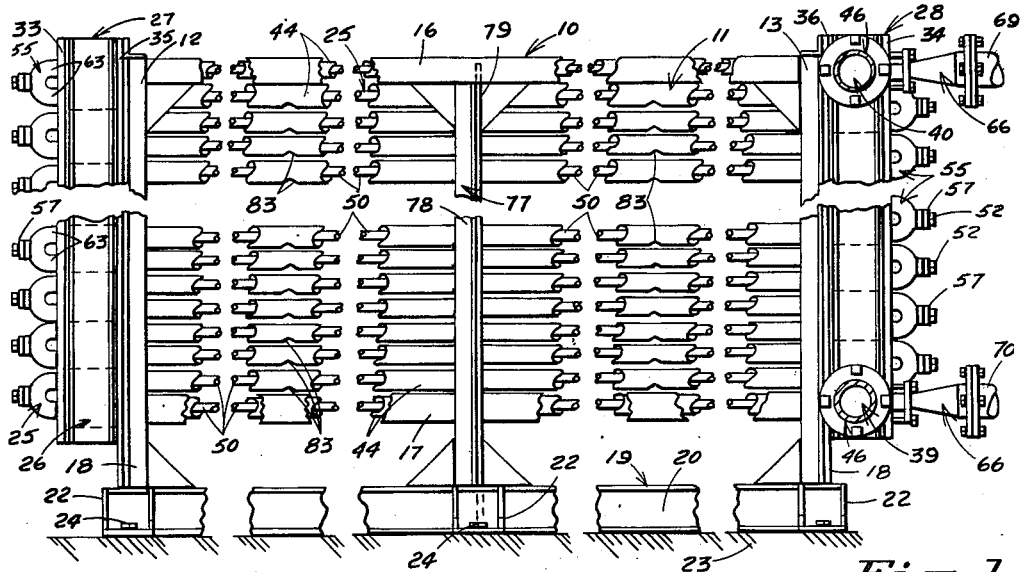
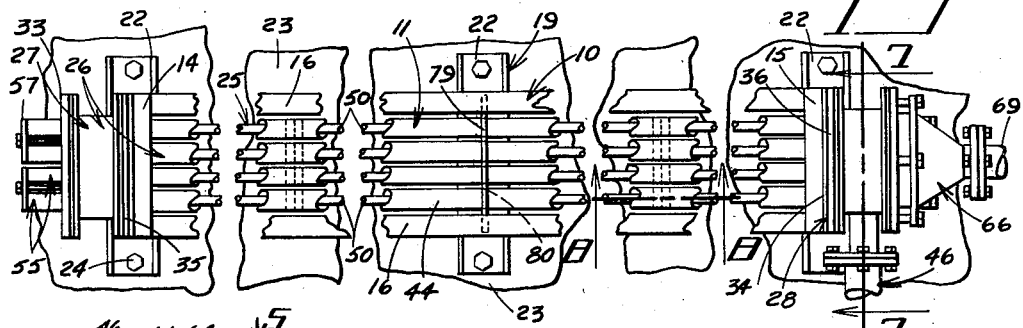
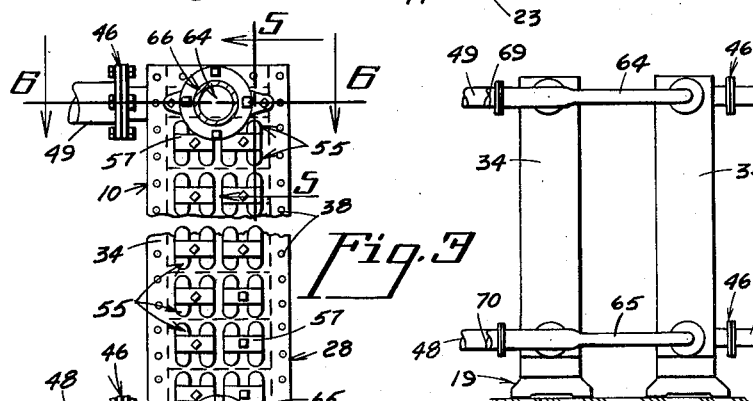
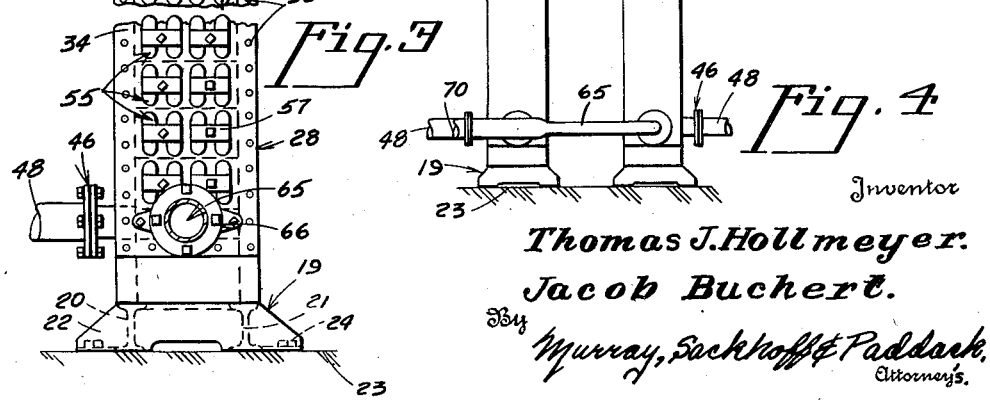

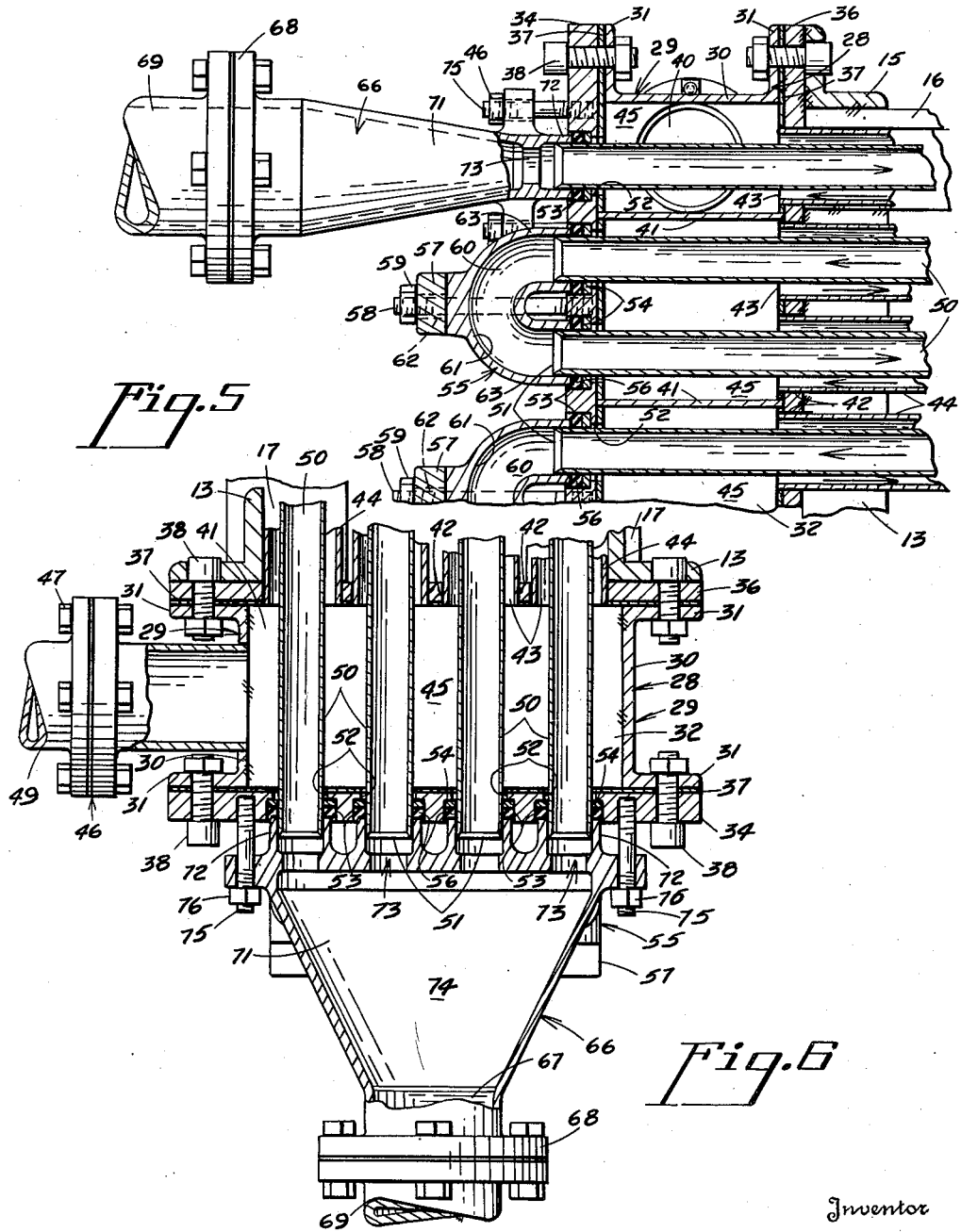

Patented Mar. 13, 1951

2,545,280

UNITED STATES PATENT OFFICE 2,545,280

HEAT EXCHANGE APPARATUS

Thomas J. Hollmeyer and Jacob Buchert, Cincinnati, Ohio, assignors to Ansonia Copper and Iron Works, Inc., Cincinnati, Ohio, a corporation of West Virginia Application May 15, 1947, Serial No. 748,226

3 Claims. (Cl. 257—247)

The present invention relates to heat-exchange apparatus and more particularly to improvements in the double pipe, closed type heat-exchangers utilizing the counter-flow principle. Specifically, the invention is directed to heat-exchangers as applied in the brewery industry, and the refrigeration of material containing organic matter.

The process of manufacturing fermented liquors such as the operation of brewing, requires that the beer wort be cooled from a boiling temperature to one best suited for the starting of fermentation, preferably about 40 to 55 degrees Fahrenheit. This reduction of temperature of the wort is accomplished by several operational steps. In the first step the hot wort is introduced into coolers, the most important function of which is to allow the deposition of sludge and to effect hot-aeration of the wort. In this step, the wort is held at a temperature not below 180 to 190 degrees Fahrenheit, to assure that airborne organisms shall not germinate in it. Thereafter, as a second cooling step, the wort is refrigerated to the desired fermentation temperature by means of regrigerators or heat-exchangers. These apparatus are made in many different forms, one class which includes the Baudelot type, a modern version of which is the pipe within a pipe, closed type heat-exchanger utilizing the counter-flow principle of heat-exchange. Obviously, the closed Baudelot apparatus is much preferred where the organic material to be conditioned is at all subject to airbore contamination, and particularly where such substances are at a temperature favorable to bacteria germination.

The present invention has as an object the solution of many of the problems encountered in the use of the closed Baudelot refrigerators, amongst which is the common difficulty of reducing the size and cost of equipment without sacrificing the effectiveness of the apparatus.

Included in the reduction of cost, is the necessity of fabricators to construct heat-exchangers according to the order of the purchaser. A major factor in determining the type of heat-exchanger to be used entails at times the selection of an inferior type, because of the limited nature of the available floor space allocated for the heat reducing equipment. The present apparatus has therefore, as another object of invention, a unique combination of elements that structurally lends itself to almost any demand that may be required by limited floor space, additional load or the further reduction of the temperature of the fluid to be conditioned.

The coefficient of heat transfer, or the heat transfer efficiency of the double pipe, closed type heat-exchanger varies considerably, depending upon the kind of fluids on the two sides of the heat-exchanging conduit, the velocity of these fluids, the kind of metals composing the heat-transfer surfaces, and in particular, it varies according to the degree of contamination of the heat-transfer surfaces caused by the collection of scale and dirt. With the latter in mind, an additional object of the invention is to provide means whereby this scale and other surface restrictions to fluid flow and heat transfer may be eliminated by a single cleaning operation.

Further objects and advantages are within the scope of this invention such as relate to the arrangement, operation and function of the related elements of the structures as described in the following specification and illustrated drawings in which;

Fig. 1 is a fragmental, front elevational view of my heat-exchanger.

Fig. 2 is a top plan view of the structure as illustrated in Fig. 1.

Fig. 3 is an end elevation of the structure shown in Fig. 1, and shows the header provided with the fluid inlets and outlets for the apparatus.

Fig. 4 is a representation of several heat-exchange units showing a means of connecting the units for increased volume.

Fig. 5 is an enlarged cross section of the supply header taken on line 5—5 of Fig. 3 showing in detail the means of communication between successive series of fluid conduits.

Fig. 6 is an enlarged cross section of the supply header taken on line 6—6 of Fig. 3 showing the manifold inlet to the heat-exchange tubes and the outlet from the jacket tubes.

Figure 7:
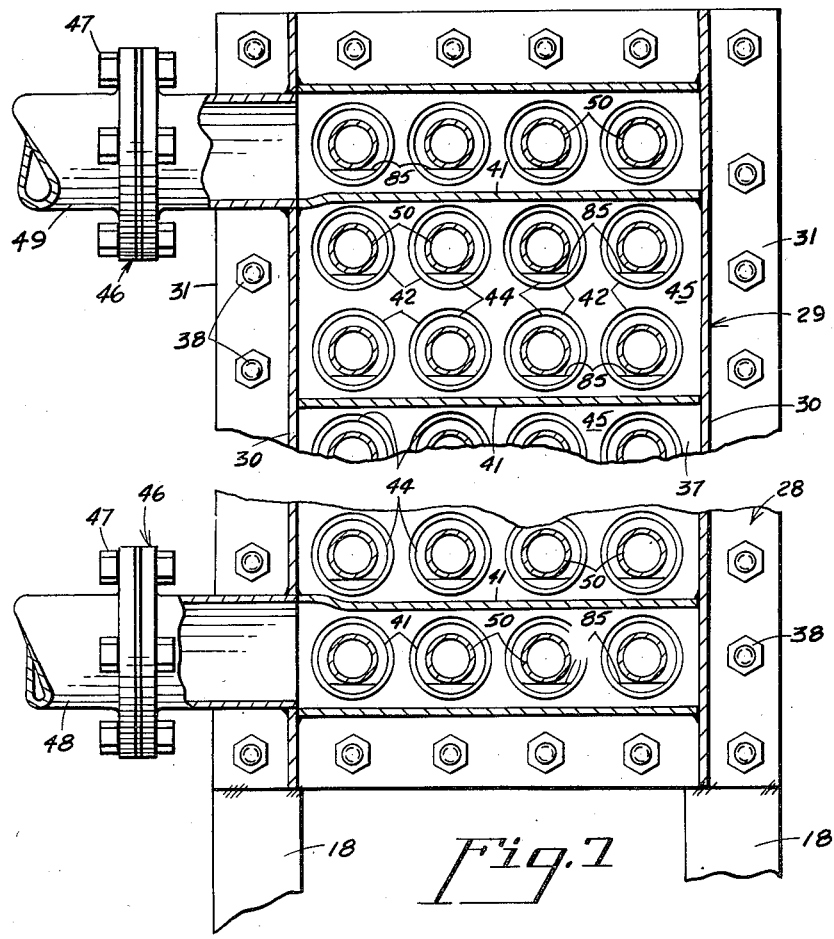
Fig. 7 is an enlarged cross-sectional view taken on line 7—7 of Fig. 2 showing the chambered interior of the supply header and the inlet for the conditioning medium.
Figure 8:
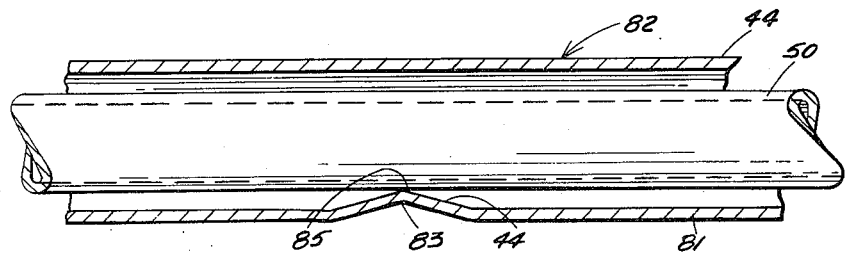
Fig. 8 is an enlarged cross section of the conduits of the unit taken on line 8—8 of Fig. 2, wherein there is disclosed the supporting means for the heat-exchange tubes.

The wort refrigerator of the brewing industry is an apparatus made in many different forms, that most commonly employed being the vertical one, which, in most of its variations, is substantially a modification of the Baudelot open type wort refrigerator. In its original design it consists of two upright metal standards between which a number of horizontal tubes are fixed, having attached to their under sides narrow strips of copper sheet. The cooling medium is admitted into the lowermost tube, from whence it passes to the tube immediately above, and so on, until at last it emerges from the uppermost tube. The wort is introduced into a trough placed at the top of the apparatus, the base of which is perforated with a series of fine holes. Through these the wort flows on to the first tube; after passing over this tube it falls on to the next, an so on until at last it reaches the trough in which the apparatus stands, from whence a pipe conveys it to the fermenting vessel.

Modern brewing methods now demand a closed wort refrigerating system to protect the liquor against contamination. These units are generally structurally similar to the original Baudelot refrigerator, with however this exception, that closed conduits are provided for the conveyance of the fluids. The modern versions of this apparatus require means for periodic cleaning of the conduits, an important operation which is frequently necessary when the water used for cooling purposes is at all contaminated or contains carbonate of lime in solution. Heretofore, thoroughness of the cleaning operation of the closed type wort refrigerator has been dependent upon the employment of skilled labor, and in the modified spiral conduit type of Baudelot unit, practically impossible to accomplish regardless of the skill of those employed.

The invention as disclosed in the accompanying drawings may be classified as a heat-exchanger falling within the vertical type refrigerator. It will be apparent from the following description, however, that the general structure is adaptable to horizontal assembly or any of numerous requirements necessitated by individual problems of installation. It is understood therefore, that I do not wish to limit myself to the form shown, but that the same is illustrative only of the invention.

In the following description of my heat-exchanger apparatus, I have illustrated the device as consisting of two related structures, i. e., the support 10, which constitutes the sustaining frame of the heat-exchanger, and the refrigerator 11, embodying the elements of heat transmission.

Referring to the drawings, which are illustrative of a practical application of the principles of the present invention, the support 10 of the apparatus consists of two separate pairs of vertical uprights 12 and 13, the angle irons of which are joined in spaced parallelism to one another by transverse angle irons 14 and 15. The two pairs of uprights 12 and 13 comprising the vertical angle irons are then joined in spaced parallelism by the longitudinal irons 16 and 17. The frame work of the support 10, thereby describes in outline, substantially an elongated rectangular parallelopiped.

For purposes of anchoring the frame, the depending ends 18 of the vertical uprights 12 and 13 are mounted to a base 19, that comprises two I beams 20 and 21 fixed parallel to one another by cross members 22. A permanent installation of the apparatus may be attained by securing the base 19 to a supporting surface, such as a floor 23 of a manufactory, by means of bolts 24.

The structure 11 that effects the fluid conditioning function of the apparatus, consists broadly of a heat-exchange conduit system 25, which acts as a means to convey the fluid to be conditioned, also, the apparatus has a conduit system 26 that conveys the conditioning medium. This latter system 26 in my heat-exchanger, substantially houses the conduit of the first system 25.

The conduit system 26 of the refrigerator 11 includes a pair of spaced rectangular, and hollow headers 27 and 28, preferably fabricated from sheet metal, and rigidly secured in a vertical position to the extremities of the support 10. As illustrated in Figs. 5 and 6, the main body of the headers 27 and 28 consist of a rigid shell 29, the edges of which are bent at right angles from the walls 30 thereof, to form flanges 31. To enclose the interiors 32 of the shells, the spaced headers 27 and 28 are further provided with opposing panels 33 and 34, and adjacent panels 35 and 36. To complete the insulation of the interiors 32, gaskets 37 are interposed between the panels and the flanges 31, and finally, the panels are removably secured to the flanges 31 by bolts and nuts 38.

The conduit system further includes a means for fluid communication between the two headers 27 and 28, an inlet 39, and an outlet 40 for the supply of refrigerant to the heat-exchange apparatus, and baffles 41 for directing the coolant for efficient heat transfer.

To effect communication between the interiors 32 of the respective headers 27 and 28, there is formed in the adjacent panels 35 and 36 thereof, a plurality of aligned series of perforations 42 for the reception of the ends 43 of the jacket tubes 44. The interiors 32 of the headers are then segregated into chambers 45 by baffles 41 for the purpose of directing the conditioning medium of the heat-exchanger from the inlet 39, alternately from one series of jacket tubes to another, and progressively upward through successive series of these tubes to the outlet 40.

A coupling 46 is mounted to the inlet 39 and outlet 40 of the conduit system 26, whereby a source of supply of refrigerant is introduced to the system and vented therefrom. The coupling includes a means 47 for attaching a supply pipe 48 and a vent pipe 49.

The remaining structure of my invention to be described, has reference to the conduit system 25, which comprises the heat-exchange elements of the apparatus. The system consists of a plurality of closed heat-exchange tubes 50 positioned between the two headers 27 and 28, the ends 51 of which extend through the interiors 32 and project beyond the opposing panels 33 and 34. Further, each heat-exchange tube 50 is housed by one of the jacket tubes 44 in circumferential spaced relation to the interior thereof. A plurality of perforations 52 are provided in the opposing panels 33 and 34 to freely accommodate the ends 51 of the tubes 50. These perforations 52 are in alignment with the perforations 42 in the adjacent panels 35 and 36, and by this relationship there is provided a series of aligned openings for the reception of each heat-exchange tube 50.

The difficulties, previously referred to, which are experienced in cleaning the conduits of the conventional heat-exchangers, are surmounted in my apparatus by a unique arrangement of parts, the simplicity of which, eliminates the necessity of employing skilled labor to perform the operation. This is accomplished by forming counter bores 53 centrally about the perforations 52, that are opened to the exterior of the opposing panels 33 and 34, for the removable reception of the inserts 54. The inserts are centrally perforated to freely hold the heat-exchange tubes 50 in their circumferential relationship with the interior of the jacket tubes 44. The elbows 55 are removably sealed to the opposing ends 51 of successive heat-exchange tubes by the combination of washers 56, clamps 57, bolts 58 and nuts 59. These elbows have an interior 60 for directing the flow of the fluid to be conditioned, the walls 61 of which, are substantially U-shaped in longitudinal cross-section (Fig. 5), and circular in transverse cross-section. The diameter of the interior 60 being sufficient to receive the ends 51 of the heat-exchange tubes. Each clamp 57 consists of a rectangular piece of bar stock, that has a perforation 62 centrally positioned therethrough for the reception of the bolts 58.

The clamps 57 are brought to bear against adjacent pairs of elbows by bolts 58 mounted to the panels 33 and 34 respectively, and nuts 59 threadedly engaged to these bolts. Thus, by turning up the nuts 59, the ends 51 of the heat-exchange tubes are inserted within the respective arms 63 of the elbows, and sealed by the washers 56, which are positioned within the bore 53 intermediate the insert 54 and the arms 63 of the elbows. With this arrangement of the heat-exchange conduit system 25, coupled with the fact that the heat-exchange tubes are free for horizontal movement within the inserts 54, the structure 11 may be readily dismantled for the cleaning operation of the heat exchange apparatus.

The fluid to be conditioned is introduced to the heat-exchange tubes 50 by an inlet 64, and is then directed alternately through successive heat-exchange tubes by means of the elbows 55, and thence to the outlet 65 in the base of the structure. The fluid is conveyed by the heat-exchange tubes progressively downwardly through the apparatus in a direction of flow opposite to that of the conditioning medium conveyed by the outer jackets 44.

A manifold 66 is mounted to the inlet 64 and the outlet 65 of the heat-exchange tubes 50, whereby a source of fluid supply is introduced, and vented from the apparatus. The manifolds, in longitudinal cross-section (Fig. 6) have the general appearance of a V, the apex of which, has an opening 67 for the fluid and a coupling 68 for attaching the manifold to a supply pipe 69 and a vent pipe 70. At the opposite end 71 of the manifold, there are a plurality of extensions 72, the total number included on any one manifold being dependent upon the number of heat-exchange tubes 50 that comprises each series of these tubes in a particular installation. An opening 73 is provided in the body of the extensions for fluid access to the interior 74 of the manifold, and for the reception of the ends 51 of the heat-exchange tubes. The extensions 72 are then sealed to the washers 56 by bolts 75, which are mounted to the respective panels 33 and 34 and by nuts 76 which are in turn threadedly engaged to these bolts.

In these installations of my refrigerator where the span of the jacket tubes 44 between the headers 27 and 28 is excessive, that is, in comparison to practical wall thicknesses of the tubes, I incorporate to the support 10 of the apparatus, one or more additional uprights 77. These uprights consist of two parallel angle irons 78 which are mounted to the longitudinal irons 16 and 17 and to the base 19, in a manner similar to the irons 12 and 13 of the support. There is then disposed between these irons at right angles thereto a rigid plate 79, that has a plurality of perforations 80 in alignment with the perforations 42, located in the adjacent walls 35 and 36 of the headers. The jacket tubes 44 are passed through the perforations 80, and are thereby held in aligned relationship with the perforations 42 regardless of the particular length of the tubes or the combined weight of the fluids within the respective tubes 44 and 50.

The coefficient of heat transfer in a heat-exchanger, is not only dependent upon the kind of metals composing the heat-transfer surfaces, but is also effected by the thickness of these metals. I have therefore devised a novel method to support the heat-exchange tubes 50 within the jackets 44 of my apparatus, whereby the heat transfer efficiency of the surfaces of the tubes 50 is considerably increased by reducing their wall thickness. This supporting method is accomplished by forming in the underside 81 of the body 82 of the jacket tubes 44, a plurality of depressions 83, whereby the interior wall 84 of these depressions has a raised portion 85 that acts as a rigid support for the heat-exchange tubes. It is apparent that this novel construction in a heat-exchanger lends the rigidity of the support 10 and jackets 44 to the heat-exchange tubes 50.

The apparatus as disclosed in the accompanying drawings is particularly adapted to districts where "free" refrigeration is practical, refrigeration accomplished through the use of available water. However, where the volume of water is limited, or where the desired temperature of the conditioned fluid is such that it is below that attainable by the available water supply, the disclosed apparatus may have incorporated additional couplings, similar to the couplings 46, for the introduction and removal of a refrigerated coolant to and from the conduit system 26. In such a circumstance, the refrigerated coolant may be introduced into the present inlet 39, hence through successive jacket tubes 44, and vented from the system 26 by means of the additional coupling located intermediate the present inlet 39 and outlet 40. The chamber 45, from which the refrigerated coolant is vented, should be segregated for the introduction of the water through the additional inlet where it in turn is forced upwardly through the remaining jacket tubes 44 to the present outlet 10.

What is claimed is:

1. In a heat exchange apparatus the combination of a pair of longitudinally spaced, recirculating headers each comprising a rectangular shell having marginal inside and outside bolting flanges extending at right angles from the shell, an inside and an outside tube sheet bolted to the respective flanges of each header, a row of holes formed through each of the inside tube sheets, a series of pairs of recirculating jacket tubes extending between the headers and each tube having its opposed ends expanded into the aligned holes in the inside tube sheets, a row of holes formed through each of the outside tube sheets in alignment with the holes in the inside tube sheets, a heat exchange tube extending through the central portion of each jacket tube and through the respective holes in the outside tube sheets with its ends projecting beyond said sheets, spacer elements between each pair of jacket and heat exchange tubes, a baffle carried by the shell and extending completely across the header interior between each succession of pairs of jacket tubes in the row, inlet means for introducing conditioning fluid into one end of the header, outlet means associated with the opposite end of said header, means for introducing fluid to be conditioned into an inside tube sheet adjacent the outlet means for the header, a counterbore formed in the exterior side of the outside tube sheet around each hole therein, an expansible washer seated in each counterbore and surrounding the respective end portion of the heat exchange tube that extends through said hole, an elbow having opposed annular seat portions encircling the common ends of adjacent pairs of heat exchange tubes, and mounting means on the outside tube sheet for releasably securing the annular seat portions of the elbow against their respective washers to seal the opening between the outside tube sheet and the heat exchange tube and the joint between the elbow and the said heat exchange tube.

2. A heat exchange apparatus as set forth in claim 1 wherein the spacer elements are a longitudinal row of spaced apart projections crimped in the lower portion of the jacket tube wall.

3. In a heat exchange apparatus as set forth in claim 1 wherein the elbow mounting means on the outside tube sheet comprises a bar extending across adjacent pairs of elbows, and a bolt anchored in the outside tube sheet and passing through an aperture formed centrally in the bar.

THOMAS J. HOLLMEYER.
JACOB BUCHERT.

REFERENCES CITED

The following references are of record in the file of this patent:

UNITED STATES PATENTS

| Number | Name | Date |
|---|---|---|
| 531,000 | Morrison | Dec. 18, 1894 |
| 769,379 | Herold | Sept. 6, 1904 |
| 1,067,505 | Dalzell et al. | July 15, 1913 |
| 1,559,949 | Feldmeier | Nov. 3, 1925 |
| 1,697,696 | Rosenfeld | Jan. 1, 1929 |
| 2,085,677 | Thayer | June 29, 1937 |
| 2,090,345 | Coy | Aug. 17, 1937 |
| 2,259,433 | Kitto | Oct. 14, 1941 |